United States Patent [19]
Yamate et al.

[11] Patent Number: 5,528,465
[45] Date of Patent: Jun. 18, 1996

[54] ASSEMBLY FOR REMOVING JAMMING SIGNALS

[75] Inventors: Kazunori Yamate, Ibaraki; Chikara Watanabe, Osaka; Youichi Ishibashi, Ibaraki, all of Japan

[73] Assignee: Matsushita Electric Industrial Co., Ltd., Osaka, Japan

[21] Appl. No.: 407,950

[22] Filed: Mar. 22, 1995

Related U.S. Application Data

[62] Division of Ser. No. 205,735, Mar. 4, 1994, Pat. No. 5,448,445.

[30] Foreign Application Priority Data

Mar. 5, 1993 [JP] Japan ..................................... 5-44832

[51] Int. Cl.$^6$ ................................ H05K 9/00; H03H 7/00
[52] U.S. Cl. .......................... 361/818; 174/35 R; 333/167
[58] Field of Search ..................................... 361/303–305, 361/306.1, 307, 311–313, 321.1, 302, 328–330, 816, 818; 174/51, 52.1, 35 R; 333/167, 181–185

[56] References Cited

U.S. PATENT DOCUMENTS

| | | | |
|---|---|---|---|
| 3,015,052 | 12/1961 | McHugh | 361/302 |
| 4,281,360 | 7/1981 | Brehse | 361/303 |
| 4,935,710 | 6/1990 | Yamazaki et al. | 333/167 |
| 5,023,578 | 6/1991 | Kaneko et al. | 361/330 |

FOREIGN PATENT DOCUMENTS

| | | |
|---|---|---|
| 1265509 | 10/1989 | Japan . |
| 4032170 | 2/1992 | Japan . |

*Primary Examiner*—Bot L. Ledynh
*Attorney, Agent, or Firm*—Willian Brinks Hofer Gilson & Lione

[57] ABSTRACT

A reduced size three-terminal type capacitor for removing jamming signals from an electrical signal. The three-terminal type capacitor comprises a ceramic substrate with a first ground electrode layer formed on the ceramic substrate, and a first dielectric layer formed on the first ground electrode layer. On the first dielectric layer reaching at least from one end of the first dielectric layer to the other end is a signal electrode. A second dielectric layer is formed on the first dielectric layer to surround the signal electrode together with the first dielectric layer, and a second ground electrode layer is formed on the second dielectric layer together with the first ground electrode layer. The second ground electrode layer is electrically connected to the first ground electrode layer. The structure of this three-terminal capacitor is such that first and second conductive layers (i.e. dielectric layers) are surrounded by mutually conducting first and second electrode layers so that jading signal removal is superior to that of the conventional printed type capacitor.

5 Claims, 4 Drawing Sheets

ASSEMBLY FOR REMOVING JAMMING SIGNALS

This is a divisional of application Ser. No. 08/205,735, filed Mar. 4, 1994 now U.S. Pat. No. 5,448,445.

BACKGROUND OF THE INVENTION

1. Field of the Invention

This invention relates to a three-terminal type capacitor, a three-terminal type capacitor array, and an assembly for removing jamming signals incorporating the three-terminal capacitor and/or array. The capacitor and capacitor array of this invention are suited for removing jamming signals generated by the electric circuit which includes the capacitor or jamming signals received from other electric circuits, such as in electrical appliances like television sets.

2. Description of the Prior Art

Recently, as digital circuits in electrical appliances become smaller in size and greater in function the parts used in them for removing jamming signals must also be smaller in size and have a superior ability to remove jamming signals. As a representative example of prior art systems for removing jamming signals, the assembly of FIG. 1 shows a disk-shaped feed-through capacitor 5 comprising a signal electrode 1, a dielectric 2, and a ground electrode 3. As shown in FIG. 2, feed-through capacitor 5 is attached to the input/output terminals of a metal shield case 4 incorporating electric circuits.

In this type of conventional jamming signal removal device, the spacing of signal lines is determined by the size of the feed-through capacitor 5. Therefore, when the number of signal lines increases the number of feed-through capacitors 5 contained in the metal shield case 4 increases and the size of the jamming signal assembly becomes very large. Further, the manufacturing efficiency of the jamming signal assembly is reduced due to the increased number of feed-through capacitors because each feed-through capacitor 5 must be individually soldered to metal shield case 4.

Japanese Patent Publication No. 4-32170, represented by the drawing of FIG. 3, discloses a reduced size assembly for removing jamming signal comprising a terminal-strip mounting a printed type capacitor on a metal shield case. The terminal strip is made by sequentially forming a first electrode layer 12, which is a ground electrode of the capacitor, on a ceramic substrate 11 having a penetration hole 15, and a dielectric layer 13. A second electrode layer 14 is soldered on dielectric layer 13 and around penetration hole 15, and a pin terminal 16 is inserted into the penetration hole 15. The terminal strip is fixed in a metal shield case (not shown) by a protrusion 17 of the metal shield case. Although the terminal strip of FIG. 3 can be reduced in size, the performance of jamming signal removal is reduced because the dielectric layer 13 is not wrapped in first electrode layer 12 structurally.

The devices described above provide important advantages in operation. Nevertheless, none of these devices provide the important advantage of both superior jamming signal removal in a small size assembly.

SUMMARY OF THE INVENTION

According to this invention, a reduced size three-terminal type capacitor is provided for removing jamming signals from an electrical signal. The three-terminal type capacitor comprises a ceramic substrate with a first ground electrode layer formed on the ceramic substrate and a first dielectric layer formed on the first ground electrode layer. On the first dielectric layer extending at least from one end of the first dielectric layer to the other end is a signal electrode. A second dielectric layer is formed on the first dielectric layer to surround the signal electrode together with the first dielectric layer, and a second ground electrode layer is formed on the second dielectric layer together with the first ground electrode layer. The second ground electrode layer is electrically connected to the first ground electrode layer.

In another embodiment of this invention, a reduced size three-terminal type capacitor array removes jamming signals from electric circuits. The three-terminal type capacitor array is characterized by disposing a plurality of the three-terminal capacitors of this invention on a ceramic substrate and connecting at least one of the first ground electrode layer and second electrode layer in one three-terminal type capacitor and at least one of the first ground electrode layer and second ground electrode layer in another three-terminal type capacitor through a connection member.

Furthermore, this invention provides an assembly for removing jamming signals characterized by using an insulating substrate to form a first conductive pattern for grounding and a second conductive pattern for grounding electrically connected to the first conductive pattern on the surface of the insulating substrate. At least one of either the three-terminal type capacitor and/or three-terminal type capacitor array are mounted on the first conductive pattern of the insulating substrate, and at least one of the first ground electrode layer and second ground electrode layer of the three-terminal type capacitor and/or three-terminal type capacitor array is electrically connected to the first conductive pattern of the insulating substrate. A metal shield case is then fixed to the insulating substrate so that the second conductive pattern of the insulating substrate and the bottom end of the metal shield case make contact with one another.

Additionally, this invention provides a method of making a three-terminal type capacitor or three-terminal type capacitor array. The method of making a three-terminal type capacitor comprising the steps of forming a ceramic substrate and forming a first ground electrode layer on the ceramic substrate. On the first ground electrode forming a first dielectric layer having two ends followed by a signal electrode extending at least from one end of the first dielectric layer to the other end. A second dielectric layer is then formed on the first dielectric layer to surround the signal electrode together with the first dielectric layer, and a second ground electrode layer is formed on the second dielectric layer to surround the first dielectric layer and second dielectric layer together with the first ground electrode layer, the second ground electrode being electrically connected to the first ground electrode.

The method of making a three-terminal type capacitor array is similar to the method of the making the three-terminal type capacitor, except that a plurality of three-terminal type capacitors are formed on the ceramic substrate and are then electrically connected by a connection member which connects at least one of the first ground electrode layer and the second ground electrode layer in one three-terminal type capacitor and at least one of the first ground electrode layer and second ground electrode layer in another three-terminal type capacitor.

As pointed out in greater detail below, the three-terminal type capacitor of this invention provides greater advantages over the above prior art devices. The three-terminal type capacitor and three-terminal type capacitor array are of a laminar structure wrapping the dielectric layer with the ground electrode layer, and therefore provide the important advantages of a thin structure and excellent jamming signal removal performance. In particular, by varying the thickness of the first ground electrode layer and thickness of the second ground electrode layer, the potential difference between the two ground electrode layers due to high frequency components can be eliminated and excellent jamming signal removal performance achieved.

The assembly for removing jamming signals mounting the three-terminal type capacitor and/or three-terminal type capacitor array is excellent in improving jamming signal removal performance, and the spacing of signal lines can be narrowed so that the size of the assembly can be reduced. In particular, in the assembly electrically connecting the connection member of the three-terminal type capacitor array and the first conductive pattern of the insulating substrate suppresses the generation of crosstalk occurring when the spacing of the signal lines is narrowed.

The invention itself, together with further objects and attendant advantages, will best be understood by reference to the following detailed description taken in conjunction with the accompanying drawings.

DESCRIPTION OF THE PREFERRED EMBODIMENTS

Figure 1:
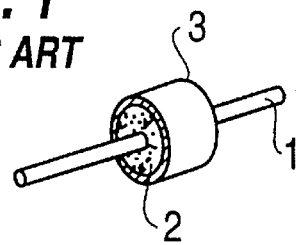
FIG. 1 is a perspective view of a conventional feedthrough capacitor.
Figure 2:
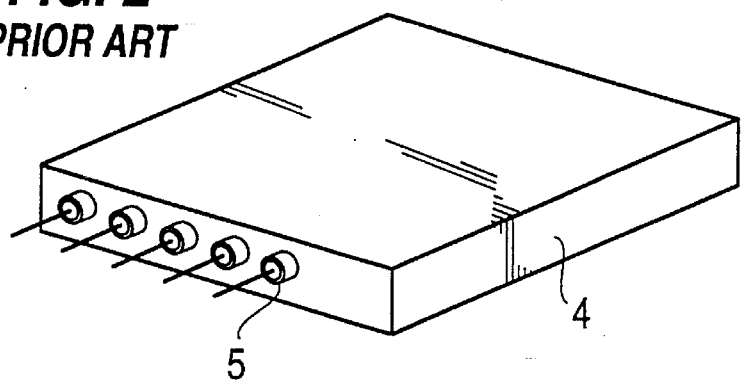
FIG. 2 is a perspective view of a conventional assembly for removing jamming signal incorporating the feed-through capacitor of FIG. 1.
Figure 3:
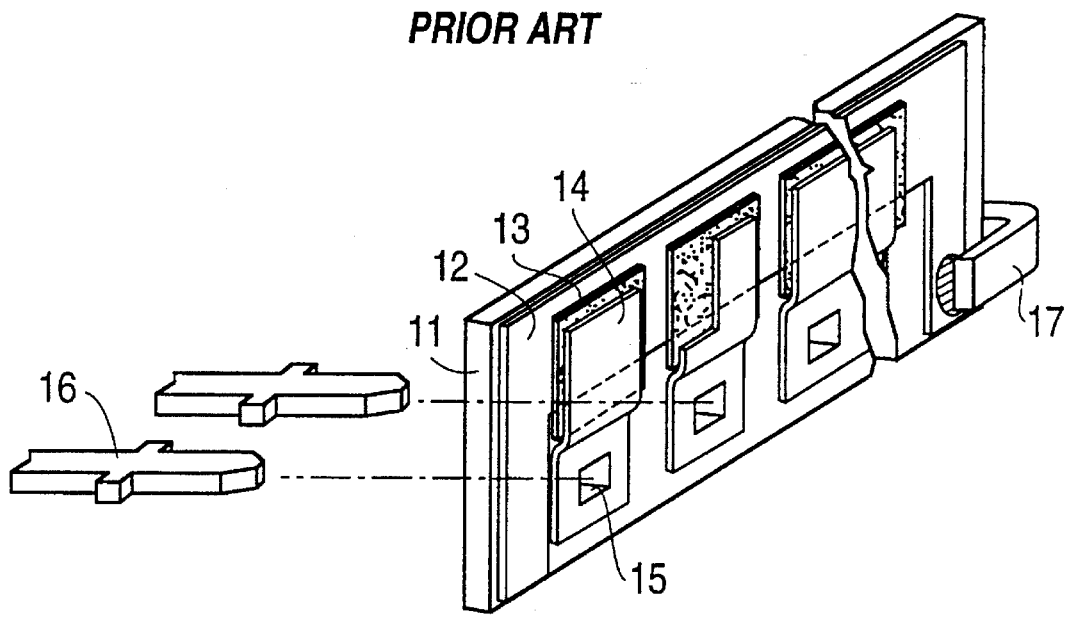
FIG. 3 is a perspective exploded view of a terminal strip including a conventional printed type capacitor.
Figure 4:
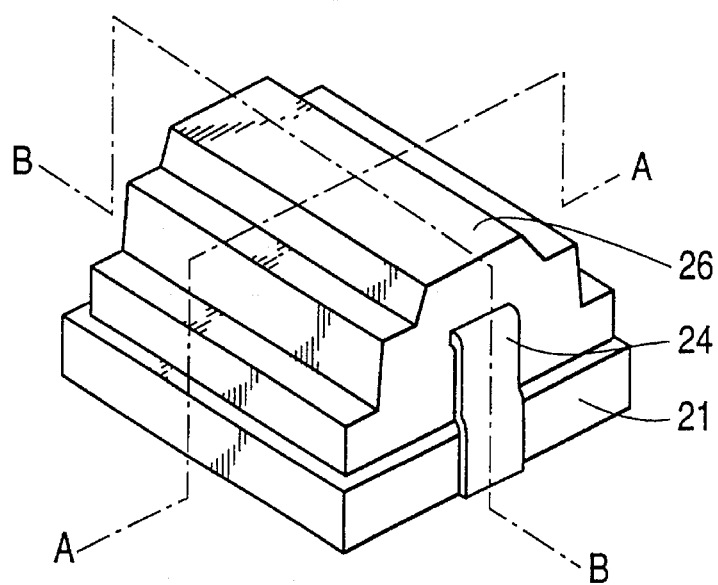
FIG. 4 is a perspective view of the preferred embodiment of a three-terminal type capacitor of this invention.
Figure 5:
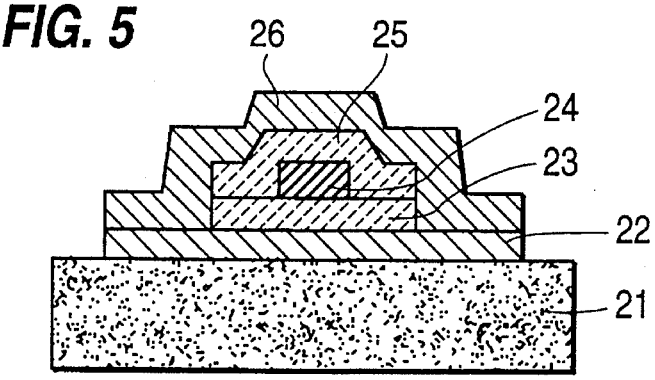
FIG. 5 is a sectional view along line A—A of FIG. 4.
Figure 6:
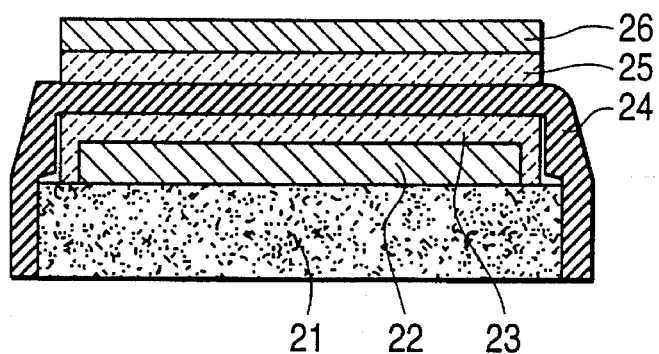
FIG. 6 is a sectional view along line B—B of FIG. 4.

Turning now to the drawings, FIG. 4 shows the overall view of a first embodiment of the three-terminal capacitor of this invention and FIGS. 5 and 6 represent sectional views of the three-terminal capacitor along lines A—A and B—B, respectively. The three-terminal capacitor of this invention is of a laminar structure and comprises a first ground electrode layer 22 formed on a ceramic substrate 21 and a first dielectric layer 23 formed on first ground electrode layer 22. A signal electrode 24, formed in the middle of first dielectric layer 23, is covered by a second dielectric layer 25 formed on first dielectric layer 23 and signal electrode 24. A second ground electrode layer 26 surrounds a second dielectric layer 25 so that both ends of second dielectric layer 25 contact and communicate with the first ground electrode layer 22.

As shown in FIG. 4, the signal electrode 24 extends from one side of the ceramic substrate 21 to the other end of the ceramic substrate 21 above the first dielectric layer 23. In the preferred embodiment, each layer of the three-terminal capacitor is formed by using thick film printing technology where the capacitor is produced by printing the electrode layer on the ceramic board and sintering the electrode layer and then printing and sintering the dielectric layer. Another suitable method to produce the invention uses dielectric green sheets instead of printing the dielectric layers or the various layers of the three-terminal capacitor can be formed by printing electrode layers and dielectric layers alternately and then sintering them.

Unlike the conventional printed type capacitor, the structure of three-terminal type capacitor is such that the first and second dielectric layers 23 and 25 are surrounded by mutually conducting first and second ground electrode layers 22 and 26. By surrounding the dielectric layers with the electrode layers, the inductance of the capacitor is reduced. Therefore, the high frequency performance of the capacitor is improved and the assembly incorporating the capacitor has superior ability to remove jamming signals.

Figure 7:
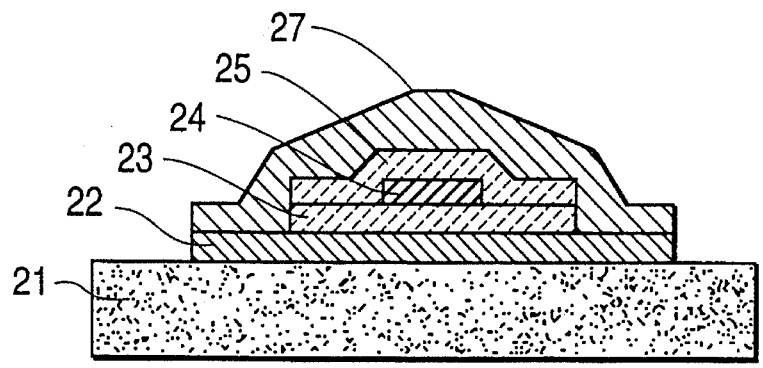
FIG. 7 is a cross sectional view of an alternative embodiment of a three-terminal type capacitor of this invention.

In an alternative embodiment shown in FIG. 7, the three-terminal type capacitor comprises a second ground electrode layer 27 which is thicker than first ground electrode layer 22. Second ground electrode layer 27 is of variable thickness with its thickest point being above second dielectric layer 25.

In a flat capacitor as shown in FIG. 4, a high frequency current flows from first and second dielectric layers 23 and 25 into first and second ground electrode layers 22 and 26. When this high frequency current is flowing in first and second ground electrode layers 22 and 26, if the first ground electrode layer 22 is connected to an external ground terminal, the impedance of the second ground electrode layer 26 further from the external ground terminal is slightly larger than the impedance of the first ground electrode layer 22. Accordingly, a potential difference exists between first ground electrode layer 22 and second ground electrode layer 26, thus lowering the performance of the three-terminal capacitor.

On the other hand, in the embodiment of FIG. 7, when the second ground electrode layer 27 is of a thickness greater than the first ground electrode layer 22, the impedance of the second ground electrode layer 27 decreases. Accordingly, when a high frequency current flows, the impedance is balanced between first ground electrode 22 and second ground electrode 27, and generation of a potential difference between first and second ground electrode layers 22 and 27 is suppressed. Therefore, when the first ground electrode layer 22 is connected to an external ground terminal, it is preferable to use a second ground electrode layer 27 that is thicker than the first ground electrode layer 22 to achieve even greater jamming signal removal performance.

Figure 8:
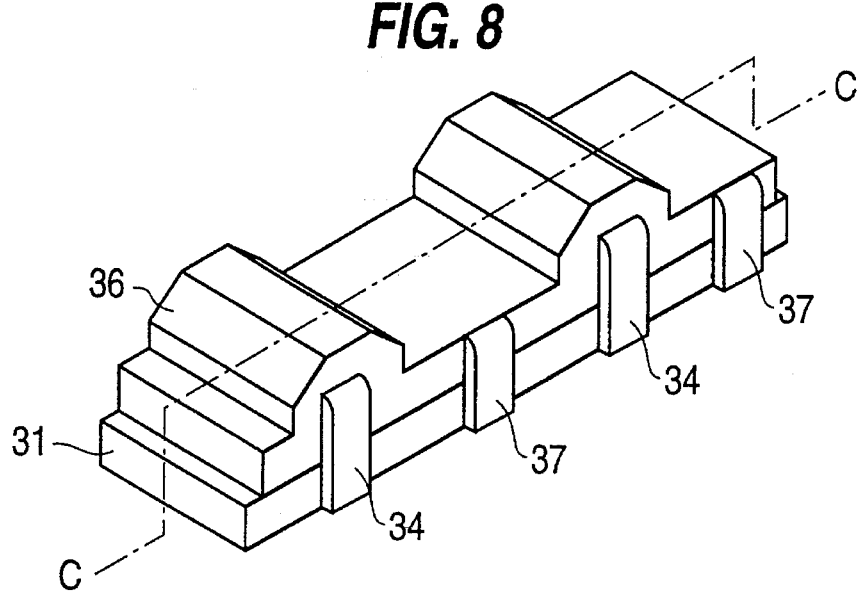
FIG. 8 is a perspective view of a three-terminal type capacitor array of this invention.
Figure 9:
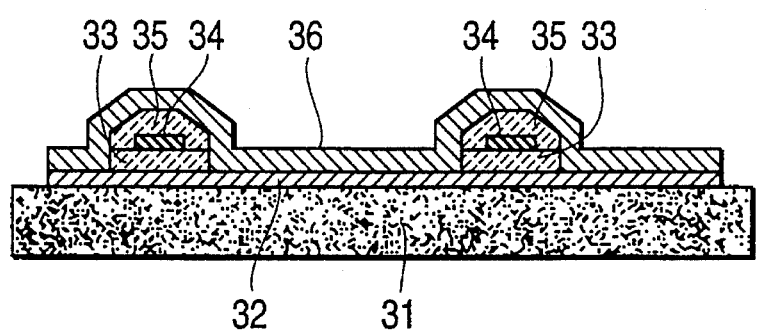
FIG. 9 is a sectional view along line C—C of FIG. 8.

In yet another variation depicted in FIGS. 8 and 9, a three-terminal type capacitor array comprises a first ground electrode layer 32 formed on a ceramic substrate 31. Two first dielectric layers 33 are formed on first ground electrode layer 32, and each first dielectric layer 33 has a signal electrode 34 formed in the middle thereon. Two second dielectric layers 35 are formed first dielectric layers 33 to cover each signal electrode 34. A second ground electrode layer 36 is formed to cover second dielectric layers 35 and to contact and communicate with first ground electrode layer 32. Each signal electrode 34 extends from one side to the other of the ceramic substrate 31 (i.e. perpendicular to line C—C) above each first dielectric layer 33. Alternating with signal electrodes 34, on the side of ceramic substrate 31, are ground terminal parts 37 which extended from the second ground electrode layer 36. In this embodiment, each layer of the three-terminal type capacitor array is formed by employing thick film printing technology. However, any other suitable method known to those skilled in the art can be used.

Figure 10:
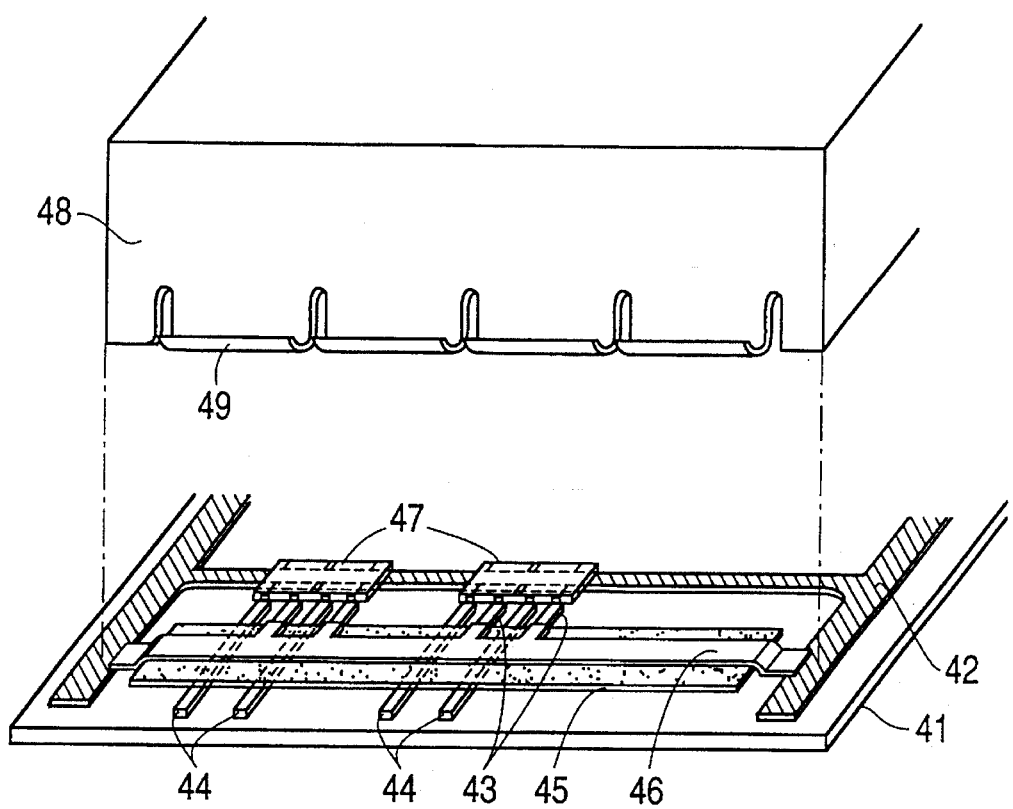
FIG. 10 is a perspective exploded view of an assembly for removing jamming signals having a three-terminal type capacitor array mounted on a printed circuit board in accordance with this invention.

In yet another variation, the three-terminal type capacitor array of FIG. 8 can be incorporated in an assembly for removing jamming signals as shown in FIG. 10. The assembly of FIG. 10 comprises a printed circuit board 41 with a three-terminal type capacitor array 47 disposed near the input and output unit of the printed circuit board 41. A metal shield case 48 fits over the printed circuit board 41 such that the entire board including the three-terminal type capacitor array 47 is covered.

In the preferred embodiment, the etching method is used to place a first conductive pattern 42 and a signal lead-out pattern 44 on the surface of printed circuit board 41. First conductive pattern 42 is for grounding and comprises a terminal connection part 43 for connecting the ground terminal of the three-terminal type capacitor array with ground. The signal lead-out conductive pattern 44 conducts the signal from an electric circuit (not shown in FIG. 10) disposed on the printed circuit board 41 to the three-terminal type capacitor array 47 by connecting with the signal electrode of the three-terminal type capacitor array 47. On the surface of the printed circuit board 41, an insulator layer 45 is formed across and above the signal lead-out conductive pattern 44. A second conductive pattern 46 is formed on the insulator layer 45, and serves as a ground and contacts the bottom end 49 of the metal shield case 48. The signal lead-out pattern 44 is positioned below the second conductive pattern 46, and is separated from the second conductive pattern by the insulator layer 45. Both ends of the second conductive pattern 46 are soldered to the first conductive pattern 42.

The above described structure provides superior ability to closely connect the bottom end 49 of the metal shield case 48 and the second conductive pattern 46. Further, it is easier to fabricate the metal shield case 48 and the printed circuit board 41. If the signal lead-out pattern 44 were positioned above the second conductive pattern 46, another insulator member would have to be placed between the signal lead-out pattern 44 and the bottom end 49 in order to insulate them. Therefore, the structure of FIG. 10 provides superior connection and fabrication.

The three-terminal type capacitor array 47 is mounted on the first conductive pattern 42 at a position adjacent to the signal lead-out pattern 44, and the ground terminal part and signal electrode of the three-terminal type capacitor array 47 are respectively connected to the terminal connection part 43 and the signal lead-out conductive pattern 44. In the preferred embodiment, the three-terminal type capacitor array 47 is mounted using a method of passing a reflow oven after applying cream solder. However, other suitable methods known to those skilled in the art can be used.

After mounting the three-terminal type capacitor array 47 on the printed circuit board 41, metal shield case 48 with an open bottom end 49 is mechanically attached to printed circuit board 41 so that bottom end 49 and second conductive pattern 46 contact each other. Bottom end 49 of metal shield case 48 is folded over like a spring to enhance the contact and electric conductivity between the bottom end 49 and second conductive pattern 46.

In order to remove jamming signals from an electric circuit, the three-terminal type capacitor array of FIG. 10 conducts a signal from an electric circuit (not shown) on the printed circuit board 41 to the signal electrode 34 of the three-terminal type capacitor array 47. This signal includes the both the jamming signal and the original signal. The frequency of the jamming signal is usually different from that of the original signal. When the jamming signal passes the three-terminal type capacitor array 47, it goes to the first conductive pattern 42 through the ground terminal part 37. The apparent filter matching the frequency of the jamming signal is composed of capacitance of the three-terminal type capacitor array 47 and impedance of the electric circuit, and the jamming signal is attenuated by this filter, thus causing the three-terminal type capacitor array to remove the jamming signals. Once the jamming signal is removed, the signal is conducted to the signal lead-out conductive pattern 44.

This assembly utilizing the three-terminal type capacitor array provides a thin device with excellent performance in removing jamming signals. Moreover, since the ground terminal part disposed between signal electrodes of the three-terminal type capacitor array 47 is directly connected to terminal connection part 43 of first conductive pattern 42 generation of crosstalk is suppressed. Further, the number of elements comprising the assembly is small, thus, manufacture using soldering by a reflow oven is feasible.

As discussed above, the three-terminal type capacitor array can be used in an assembly for removing jamming signals, as can the various embodiments of the three-terminal type capacitor. However, it is easier to incorporate the three-terminal type capacitor array in an assembly than a plurality of three-terminal capacitors because where the gap between the signal electrodes is narrow, crosstalk is likely between the signal electrodes when three-terminal type capacitors are used as opposed to three-terminal type capacitor arrays.

Further, if the gap between the signal electrodes is very narrow, crosstalk is likely to occur between signal lines in a printed circuit board mounting the three-terminal type capacitor or three-terminal type capacitor array. However, by connecting the ground electrode pattern of the printed circuit board and ground terminal parts 37, generation of crosstalk between the signal lines can be suppressed. Thus, in the assembly for removing jamming signals, particularly where the spacing of the signal electrodes is narrow, it is preferable to use the three-terminal type capacitor array.

Figure 11:
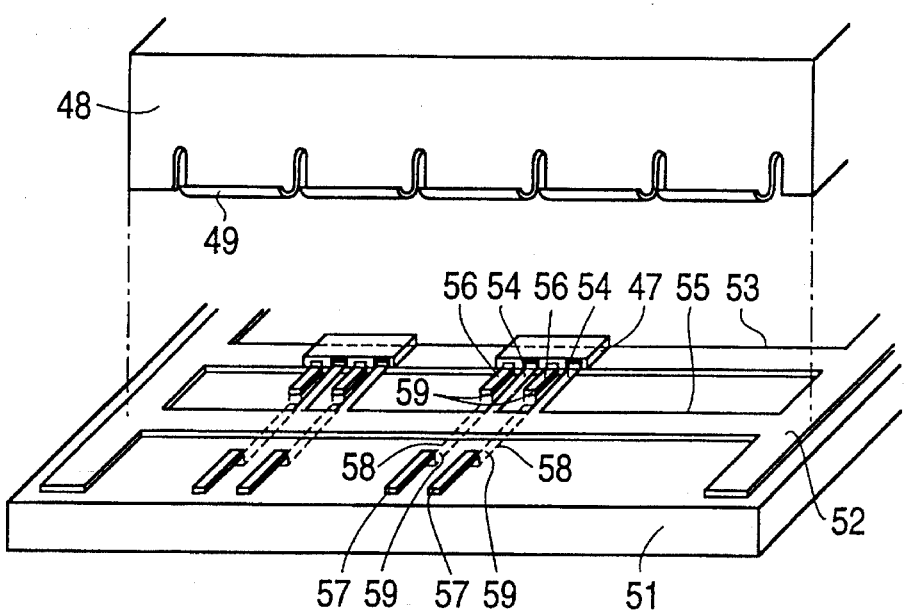
FIG. 11 is a perspective exploded view of an assembly for removing jamming signal having a three-terminal type capacitor array mounted on a multilayer printed circuit board in accordance with this invention.

In yet another variation depicted in FIG. 11, a multilayer printed circuit board 51 having an internal conductive pattern can be used in an assembly for removing jamming signals. On the surface of a multilayer printed circuit board 51 is a grounding conductive pattern 52. Grounding conductive pattern 52 is made by integrally forming a first conductive pattern 53, mounted with a three-terminal type capacitor array 47; a terminal connection part 54, to be connected to the ground terminal part of the three-terminal type capacitor array 47; and a second conductive pattern 55, to tightly contact the bottom end 49 of metal shield case 48. Furthermore, on the surface of multilayer printed circuit board 51, a first signal lead-out pattern 56 connected to the signal electrode of the three-terminal type capacitor array 47 and a second signal lead-out pattern 57 connected to an external circuit do not contact the second conductive pattern 55.

On the other hand, inside of the multilayer printed circuit board 51, a signal lead-out conductive path 58 is provided beneath second conductive pattern 55 and both ends of signal lead-out conductive path 58 are connected to a through-hole 59. The first signal lead-out pattern 56 and second signal lead-out pattern 57 are electrically connected by way of through-hole 59 and signal lead-out conductive path 58.

The assembly using the multilayer printed circuit board 51, the three-terminal type capacitor array 47, and metal shield case 48, can be manufactured using the reflow method or any other suitable method known to those skilled in the art.

Variations of the embodiments described above are possible. For example, in the three-terminal type capacitor array shown in FIG. 8, two capacitors are shown, but three or more capacitors may be formed on the array as needed. Additionally, the assemblies shown in FIGS. 10 and 11 show two three-terminal type capacitor arrays, but one or three three-terminal type capacitors may be used or a mixture of three-terminal type capacitors and/or three-terminal type capacitor arrays may be used. Further, FIG. 10 shows an example using one-sided printed circuit boards, but two-sided printed circuit boards may also be used.

The embodiments of the invention described above provide a number of significant advantages. By using a three-terminal type capacitor of this invention, first and second conductive layers (i.e. dielectric layers) are surrounded by mutually conducting first and second electrode layers so that jamming signal removal is superior to that of the conventional printed type capacitor. Further, in the assembly incorporating the three-terminal type capacitor or array, electrically connecting the connection member of the three-terminal type capacitor array and the first conductive pattern of the insulating substrate suppresses the generation of crosstalk occurring when the spacing of the signal lines is narrowed, thus keeping the size of the jamming signal removal assembly small. Finally, because the size of the assembly is small, the solder reflow method of manufacture can be used, thus increasing manufacturing efficiency.

Of course, it should be understood that a wide range of changes and modification can be made to the preferred embodiments described above. It is therefore intended that the foregoing detailed description be understood be regarded as illustrative rather than limiting and that it be understood that it is the following claims, including all equivalents, which are intended to define the scope of this invention.

What is claimed is:

1. An assembly for removing jamming signals comprising:

an insulating substrate forming a first conductive pattern and a second conductive pattern electrically connected with the first conductive pattern on a surface of the insulating substrate;

at least one of a three-terminal type capacitor and a three-terminal type capacitor array mounted on the first conductive pattern and connected electrically with the first conductive pattern; and a metal shield case with an open bottom end fixed to the insulating substrate so that the second conductive pattern and the bottom end make contact with each other;

wherein said three-terminal type capacitor comprises a ceramic substrate, a first ground electrode layer, a first dielectric layer having two ends and formed on the first ground electrode layer, a signal electrode formed on the first dielectric layer extending at least from one end of the first dielectric layer to the other end, a second dielectric layer formed on the first dielectric layer to surround the signal electrode together with the first dielectric layer, and a second ground electrode layer formed on the second dielectric layer to surround the first dielectric layer and second dielectric layer together with the first ground electrode layer, the second ground electrode layer being electrically connected to the first ground electrode layer, and said three-terminal type capacitor array comprises a ceramic substrate and a plurality of three-terminal type capacitors formed on the ceramic substrate, the plurality of three-terminal type capacitors comprising a first ground electrode layer, a first dielectric layer having two ends and formed on the first ground electrode layer, a signal electrode formed on the first dielectric layer extending at least from one end of the first dielectric layer to the other end, a second dielectric layer formed on the first dielectric layer to surround the signal electrode together with the first dielectric layer, and a second ground electrode layer formed on the second dielectric layer to surround the first dielectric layer and second dielectric layer together with the first ground electrode layer, the second ground electrode layer being electrically connected to the first ground electrode layer, the second ground electrode layer being electrically connected to the first ground electrode layer.

2. The assembly for removing jamming signals of claim 1, wherein the three-terminal type capacitor array is mounted on the first conductive pattern and at least one of the first ground electrode layer and second ground electrode layer is electrically connected with the first conductive pattern.

3. The assembly for removing jamming signal of claim 1, wherein the insulating substrate comprises:

a printed circuit board forming a signal lead-out conductive pattern electrically connected with the signal electrode and positioned below the second conductive pattern; and an insulator layer positioned between the second conductive pattern and the signal lead-out conductive pattern on the surface thereof.

4. The assembly for removing jamming signal of claim 1, wherein the insulating substrate comprises:

a multilayer printed circuit board containing an internal conductive path passing beneath the second conductive pattern; and a pair of through-holes formed at both ends of the internal conductive path, one of the through-holes electrically connected with the signal electrode and the other through-hole electrically connected to a signal lead-out conductive pattern, the signal lead-out conductive pattern formed on the surface of the insulating substrate.

5. The assembly for removing jamming signal of claim 1, wherein the metal shield case comprises spring means at the bottom end to contact with the second conductive pattern.

\* \* \* \* \*